(12) United States Patent
Sato

(10) Patent No.: US 8,540,250 B2
(45) Date of Patent: Sep. 24, 2013

(54) SQUEEZE PACKING

(75) Inventor: Tetsuya Sato, Tokyo (JP)

(73) Assignee: Eagle Industry Co., Ltd. (JP)

( * ) Notice: Subject to any disclaimer, the term of this patent is extended or adjusted under 35 U.S.C. 154(b) by 100 days.

(21) Appl. No.: 13/202,964

(22) PCT Filed: Nov. 5, 2010

(86) PCT No.: PCT/JP2010/069690
§ 371 (c)(1),
(2), (4) Date: Aug. 23, 2011

(87) PCT Pub. No.: WO2012/001829
PCT Pub. Date: Jan. 5, 2012

(65) Prior Publication Data
US 2012/0112421 A1 May 10, 2012

(30) Foreign Application Priority Data
Jul. 1, 2010 (JP) .................................. 2010-150765

(51) Int. Cl.
*F16J 15/34* (2006.01)
*F16J 15/00* (2006.01)
*F16J 15/02* (2006.01)

(52) U.S. Cl.
USPC ............................ 277/371; 277/546; 277/631

(58) Field of Classification Search
CPC ............ F16J 15/348; F16J 9/14; F16J 15/442
USPC ................. 277/371, 496–499, 546–547, 631
See application file for complete search history.

(56) References Cited

U.S. PATENT DOCUMENTS

| 1,502,524 | A | * | 7/1924 | Price, Jr. ........................ 277/547 |
| 3,124,502 | A | * | 3/1964 | Radke ........................... 428/66.4 |
| 3,784,215 | A | * | 1/1974 | Ruthenberg ................... 277/496 |
| 7,341,256 | B2 | * | 3/2008 | Nakaoka et al. .............. 277/496 |
| 8,061,716 | B2 | * | 11/2011 | Wirt .............................. 277/631 |

FOREIGN PATENT DOCUMENTS

| JP | 37644 | 1/1991 |
| JP | 7198044 | 8/1995 |
| JP | 1151188 | 2/1999 |
| JP | 1163232 | 3/1999 |
| JP | 2001208202 | 8/2001 |
| JP | 2008115908 | 5/2008 |

OTHER PUBLICATIONS

International Search Report issued in PCT/JP2010/069690 dated May 11, 2010 (10 pages).
PCT Notification of Transmittal of Copies of Translation of the International Preliminary Report on Patentability, dated Feb. 21, 2013 (5 pgs).

* cited by examiner

*Primary Examiner* — Vishal Patel
*Assistant Examiner* — Nathan Cumar
(74) *Attorney, Agent, or Firm* — Hayes Soloway P.C.

(57) ABSTRACT

The present disclosure provides a squeeze packing having a cut surface that describes a three-dimensional curved surface shape, in which the cut surface can be temporarily held with ease and intimately attached in an accurate manner without the use of an adhesive during fitting onto a device. The squeeze packing has, on at least one arbitrary portion of an endless ring finished to predetermined dimensions, a cut surface describing a three-dimensional curved surface shape extending diagonally so as to form a predetermined angle θ with respect to a radial direction of the ring, having a substantially S-shaped profile in side view, and curving in a width direction.

2 Claims, 8 Drawing Sheets

Fig. 2
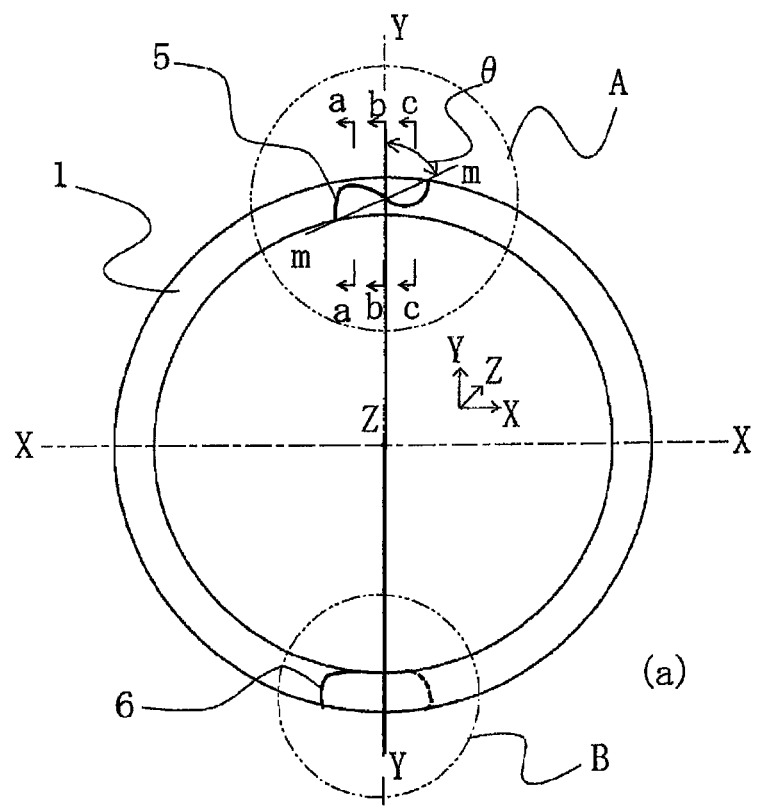
(a)
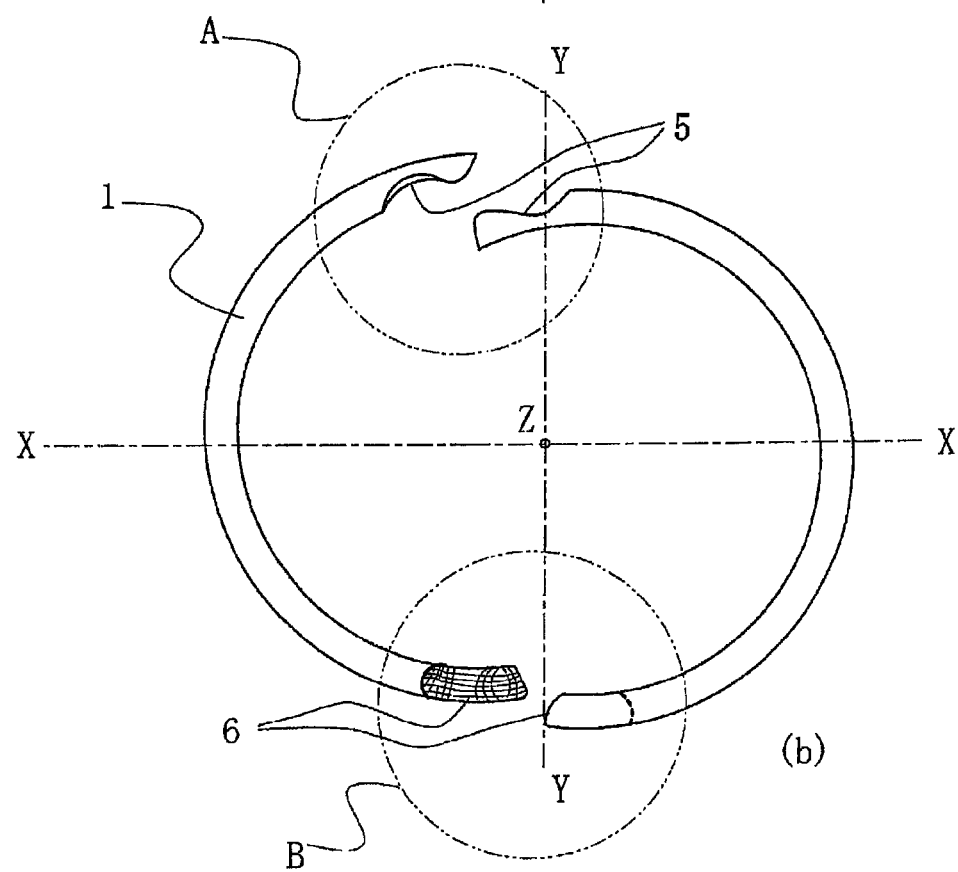
(b)

51

SQUEEZE PACKING

TECHNICAL FIELD

The present invention relates to a squeeze packing used for a mechanical seal in a pump, a stirring device, or other industrial machinery; or another type of seal.

BACKGROUND ART

Divided seals, in which a sliding sealing ring has been divided into two, are used for mechanical seals in typical pumps, stirring devices, or other industrial machinery. There is a need for O-ring-type squeeze packings used in such seals to have at least one cut portion.

O-ring-type squeeze packing may be replaced after degrading due to aging; however, since an O-ring-type squeeze packing has an endless ring shape, it is necessary to disassemble a main body of a device when the packing is fitted. Therefore, there has been proposed an O-ring-type squeeze packing in which a portion in a circumferential direction is cut. However, in such an instance, problems are presented in that sealing performance is reduced in the cut portion, as well as that cut surfaces are prone to becoming displaced, therefore making it difficult to align the cut surfaces so as to be centered correctly and causing workability to become poorer.

A method for solving the above-mentioned problems involves coating the cut surfaces with an adhesive. In an instance in which this method is used, it is necessary to take care so that adhering surfaces do not become misaligned when fitted, and time is required for the adhesive to dry, which adversely effects the workability. If a misalignment of the adhering surfaces produces a step, the sealing performance will be compromised in localized areas. Also, depending on the sealed fluid, there may be instances where an adhesive cannot be used.

Another method for solving the above-mentioned problems involves using a packing 51 in which the cut portion is given a complex structure, e.g., a structure of a ball-and-socket joint 52 as shown in FIG. 6, by molding or another method (see Patent Literature 1). In an instance in which this method is used, leakage is likely to occur due to gaps dependent on the precision of the mold during fabrication, and there is also a likelihood, during mounting, of there being a variation in circumferential length, and of a gap forming in the cut portion when fitted into a groove. Also, with a packing having a complex cut portion structure, there is a limit to materials that can be used in the fabrication, and the fabrication costs are higher. Moreover, unless spares are made available in advance, remedial measures cannot be readily taken.

There has been proposed another method for resolving the above-mentioned problems in which the cut portion is given a complex shape using an incision.

A known example is an O-ring 61 in which, as shown in FIG. 7, a pair of protrusions 62, 62 and a pair of indents 63, 63 corresponding to the protrusions 62, 62 are formed on each of two end parts, wherein the protrusions 62, 62 and the indents 63, 63 engage with each other and the two end parts join each other so that misalignment does not occur at the joining part (e.g., see Patent Literature 2).

Also, there is known a ring-shaped packing 71 in which, as shown in FIG. 8 a portion in the circumferential direction is separated in a V-shape, wherein a first separated end surface 72 having a V-shaped concave surface shape and a second separated end surface 73 having a V-shaped convex surface shape join each other, thereby reproducing a ring shape that was present before separation (e.g., see Patent Literature 3).

In the examples shown in FIGS. 7 and 8, a problem is presented in that, although misalignment does not occur in the cut portion, no hooking mechanism exists in an axial direction, therefore making it difficult to temporarily hold the cut portion and dramatically reducing workability. A problem is also presented in that machining cannot be readily performed.

PRIOR ART LITERATURE

Patent Literature

Patent Literature 1: JP-A H07-198044
Patent Literature 2: Examined Utility Model Application Publication No. H03-7644
Patent Literature 3: JP-A 2001-208202

SUMMARY OF INVENTION

Technical Problem

In order to solve the problems presented by the prior art as described above, an object of the present invention is to provide a squeeze packing having a cut portion on at least one arbitrary location of an endless ring finished to predetermined dimensions, the squeeze packing having a cut surface that has a three-dimensional curved surface shape, in which the cut surface can be temporarily held with ease and intimately attached in an accurate manner without use of an adhesive during fitting onto a device.

Another object of the present invention is to provide a manufacturing method comprising being able to manufacture the squeeze packing using a simple cutting process without performing a complex incision process.

Another object of the present invention is to provide a jig that is suitable for manufacturing the squeeze packing.

Solution to Problem

In order to achieve the above objects, a squeeze packing according to the present invention is characterized in having, on at least one arbitrary portion of an endless ring finished to predetermined dimensions, a cut surface describing a three-dimensional curved surface shape extending diagonally so as to form a predetermined angle $\theta$ with respect to a radial direction of the ring, having a substantially S-shaped profile in side view, and curving in a width direction.

According to the squeeze packing of the present invention, the cut surface has a complex three-dimensional curved surface shape that does not become displaced in an axial direction or the width direction of the ring. Therefore, it is possible to obtain sufficient sealing performance at the cut surface, and during fitting onto a device, a state of alignment can be maintained and the cut surface can be temporarily held with ease without use of an adhesive. Also, the cut surface is formed by cutting, instead of molding, therefore making it possible to prevent occurrence of a gap between joining surfaces due to molding, and to bring the joining surfaces into intimate contact with a high degree of accuracy. Also, since a cut surface is formed by cutting a commercially available endless ring, it is possible to improve the accuracy of fitting onto a device, and to improve sealing performance. Also, since a selection can be made from standard sizes, it is possible to use ring-fitting grooves having appropriate specifications. Therefore, no gap is produced at the cut surface when the ring is fitted into the groove.

The method for manufacturing the squeeze packing according to the present invention is characterized in comprising:

applying a twist in at least one arbitrary portion of an endless ring finished to predetermined dimensions, the twist being centered about a circumferential direction axis of the ring; bending the ring in an S-shape; and cutting the [bent] portion diagonally, thereby forming a cut surface that, when the twist is released, describes a three-dimensional curved surface shape extending diagonally so as to form a predetermined angle θ with respect to a radial direction of the ring, having a substantially S-shaped profile in side view, and curving in a width direction.

According to the method for manufacturing the squeeze packing of the present invention, manufacture is possible using a simple cutting process without performing a complex incision process, and manufacturing cost can be minimized. Also, in an unexpected event, a commercially available endless ring can be used to manufacture the squeeze packing on site or at another convenient location.

A jig for manufacturing the squeeze packing according to the present invention is characterized in having, on a substrate, fixed-side clamping means and twist-side clamping means, the fixed-side clamping means being capable of immobilizing one arbitrary location on an endless ring finished to predetermined dimensions and the twist-side clamping means being capable of immobilizing the ring, which is twisted about a circumferential direction axis, and having, on a surface of the substrate between the two clamping means, a cutting line groove that diagonally intersects a line linking the two clamping means.

According to the jig for manufacturing the squeeze packing of the present invention, it is possible to use a simple manufacturing device to manufacture a predetermined squeeze packing without increasing the scale of the manufacturing device.

Advantageous Effects of Invention

The present invention has the following exceptional effects.

(1) The squeeze packing according to the present invention has, on at least one arbitrary portion of an endless ring finished to predetermined dimensions, a cut surface having a three-dimensional curved surface shape extending diagonally so as to form a predetermined angle θ with respect to a radial direction of the ring, having a substantially S-shaped profile in side view, and curving in a width direction. The cut surface thereby describes a complex three-dimensional curved surface shape that does not become displaced in an axial direction or the width direction of the ring, sufficient sealing performance can be obtained at the cut surface, and during fitting onto a device, a state of alignment can be maintained and the cut surface can be temporarily held with ease without use of an adhesive. Also, the cut surface is formed by cutting, instead of molding, therefore making it possible to prevent occurrence of a gap between joining surfaces due to molding, and to bring the joining surfaces into intimate contact with a high degree of accuracy. Also, since a cut surface is formed by cutting a commercially available endless ring, it is possible to improve the accuracy of fitting onto a device, and to improve sealing performance. Also, since a selection can be made from standard sizes, it is possible to use ring-fitting grooves having appropriate specifications. Therefore, no gap is produced at the cut surface when [the ring is] fitted into the groove.

(2) According to the method for manufacturing the squeeze packing according to the present invention, a twist is applied in at least one arbitrary portion of an endless ring finished to predetermined dimensions, the twist being centered about a circumferential direction axis of the ring; the ring is bent in an S-shape; and this portion is cut diagonally, thereby forming a cut surface that, when the twist is released, has a three-dimensional curved surface shape extending diagonally so as to form a predetermined angle θ with respect to a radial direction of the ring, having a substantially S-shaped profile in side view, and curving in a width direction. Therefore, manufacture is possible using a simple cutting process without performing a complex incision process, and manufacturing cost can be minimized. Also, in an unexpected event, a commercially available endless ring can be used to manufacture the squeeze packing on site or at another convenient location.

(3) A jig for manufacturing the squeeze packing according to the present invention has, on a substrate, fixed-side clamping means and twist-side clamping means, the fixed-side clamping means being capable of immobilizing one arbitrary location on an endless ring finished to predetermined dimensions and the twist-side clamping means being capable of immobilizing the ring, which is twisted about a circumferential direction axis, and has, on a surface of the substrate between the two clamping means, a cutting line groove that diagonally intersects a line linking the two clamping means. It thereby becomes possible to use a simple manufacturing device to manufacture a predetermined squeeze packing without increasing the scale of the manufacturing device.

BRIEF DESCRIPTION OF DRAWINGS

FIG. 2 is a side view of the O-ring according to the embodiment of the present invention when viewed from a front side, where FIG. 2(a) shows a state in which a cut portion is joined, and FIG. 2(b) shows a state in which the cut portion is separated;

DESCRIPTION OF EMBODIMENTS

An embodiment for carrying out a squeeze packing according to the present invention will now be described with reference to accompanying drawings. However, the description is not intended to limit the scope of the present invention, and may be changed, modified, or improved according to the knowledge held by one skilled in the art without departing from the scope of the present invention.

Figure 1:
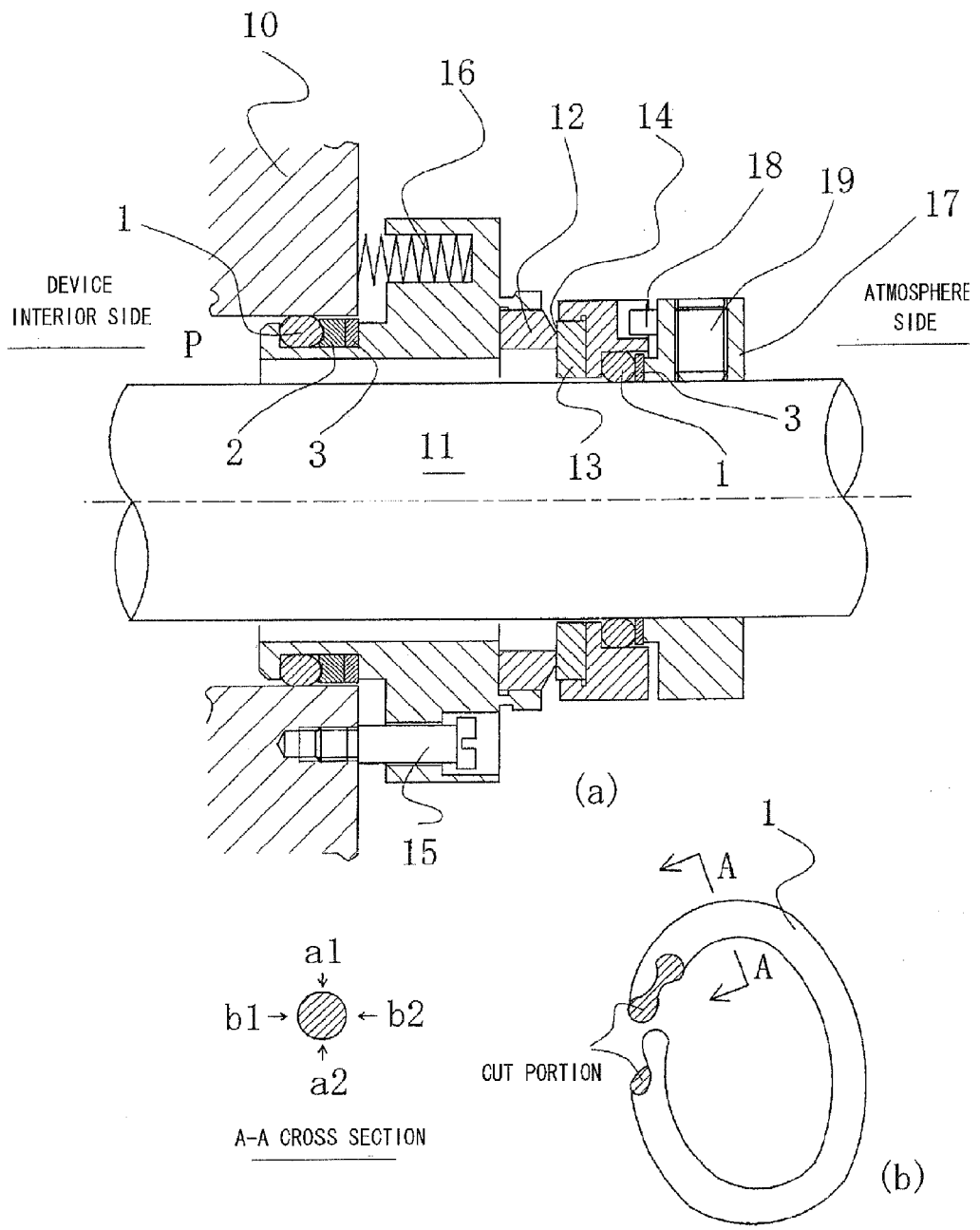
FIG. 1 is a front cross-section view used to illustrate an instance in which an O-ring according to an embodiment of the present invention is used in a mechanical seal device.

FIG. 1 shows an example in which the present invention is applied to an O-ring, which is representative of a squeeze packing. A description will be given for an instance in which the O-ring is used for a mechanical seal device. FIG. 1(a) is a front cross-section view and FIG. 1(b) is a perspective view of the O-ring.

The mechanical seal device shown in FIG. 1 has a contact-type mechanical seal structure in which a stationary-side sealing element 12 and a rotation-side sealing element 13 slide against each other in intimate contact with each other between a seal cover 10 and a rotating shaft 11 provided so as to penetrate an inner periphery of the seal cover 10. The mechanical seal device seals a fluid in a device interior side so as to prevent it from leaking from an inner periphery of a seal surface 14 towards an outer periphery direction (i.e., an atmosphere side).

The stationary-side sealing element 12 is supported on the seal cover 10 by a drive pin 15 so as to be capable of moving in an axial direction only, and is pressed towards the rotation-side sealing element 13 by a spring 16.

The rotation-side sealing element 13 is held on a collar 17 with a knock pin 18 interposed therebetween, and the collar 17 is secured onto the rotating shaft 11 by a set screw 19.

An O-ring 1 is fitted between the seal cover 10 and the stationary-side sealing element 12 and between the rotating shaft 11 and the rotation-side sealing element 13 in a state of being compressed in a vertical direction in FIG. 1(a) by an amount corresponding to the degree by which the O-ring 1 is crushed. In an instance in which a high pressure is present in the device interior side, the O-ring 1 is subjected to a fluid pressure P from the left side in FIG. 1(a) and is pressed rightwards in FIG. 1(a). However, in the present example, the O-ring 1 fitted to the stationary-side sealing element 12 is provided with a first backup ring 2 and a second backup ring 3, and the O-ring 1 fitted to the rotation-side sealing element 13 is provided with a second backup ring 3, in order to hold the O-ring 1.

At least one portion of the O-ring 1, the first backup ring 2, and the second backup ring 3 is cut.

Normally, an O-ring is finished to predetermined dimensions as a standardized item and is commercially available as an endless ring having a circular cross-section profile. The material forming an O-ring may be nitrile rubber, fluorine rubber, silicon rubber, chloroprene rubber, butyl rubber, urethane rubber, ethylene propylene rubber, acrylic rubber, or a similar material; and the material is selected according to usage.

In an O-ring according to the present invention, in order to improve the fitting process, as shown in FIG. 1(b), a cut portion is formed on at least one portion of an endless ring finished to predetermined dimensions as a standardized item, and during fitting, joining surfaces of the cut portion are joined and the O-ring is integrally fitted.

In an O-ring, it is typical for an outer periphery side a1 and an inner periphery side a2 to be subjected to fluid pressure and caused to function as squeezed surfaces (seal surfaces) and for a front side b1 and a reverse side b2 to be subjected to fluid pressure and caused to function as squeezed surfaces (seal surfaces). However, instances are not limited to those described above, and there is a possibility for surfaces in any direction to function as seal surfaces depending on the device into which the O-ring is fitted and the direction of action of the fluid pressure. In the example shown in FIG. 1, the front side b1 and the reverse side b2 are subjected to fluid pressure and caused to function as squeezed surfaces (seal surfaces).

FIG. 2 is a side view of the O-ring according to the embodiment of the present invention when viewed from one side (referred to as a "front side" for ease of description), where FIG. 2(a) shows a state in which a cut portion is joined, and FIG. 2(b) shows a state in which the cut portion is separated. In order to provide a description for a variety of types of cut portions, FIG. 2 shows an instance in which cut portions are provided at two portions of an endless ring, the cut portions being a cut portion A and a cut portion B between which the orientation of the width direction of the cut surface differs. In an instance in which coordinate axes x, y, and z are set as illustrated, the cut portion A is formed so that a cut surface 5 is disposed along the x-z plane (i.e., perpendicular to the paper surface) and the cut portion B is formed so that a cut surface 6 is disposed along the x-y plane (i.e., parallel to the paper surface). In an actual O-ring, the orientation of the cut surface is not limited to the surfaces described above; the cut surface may be formed on any surface over a 360° range. The number of cut portions may be 1, 2, or more.

In an instance in which the fluid pressure acts on the front side and the reverse side as shown in FIG. 1, it is preferable in terms of sealing performance for the orientation of the width direction of the cut surface to be parallel to the paper surface as in cut portion B.

Figure 3:
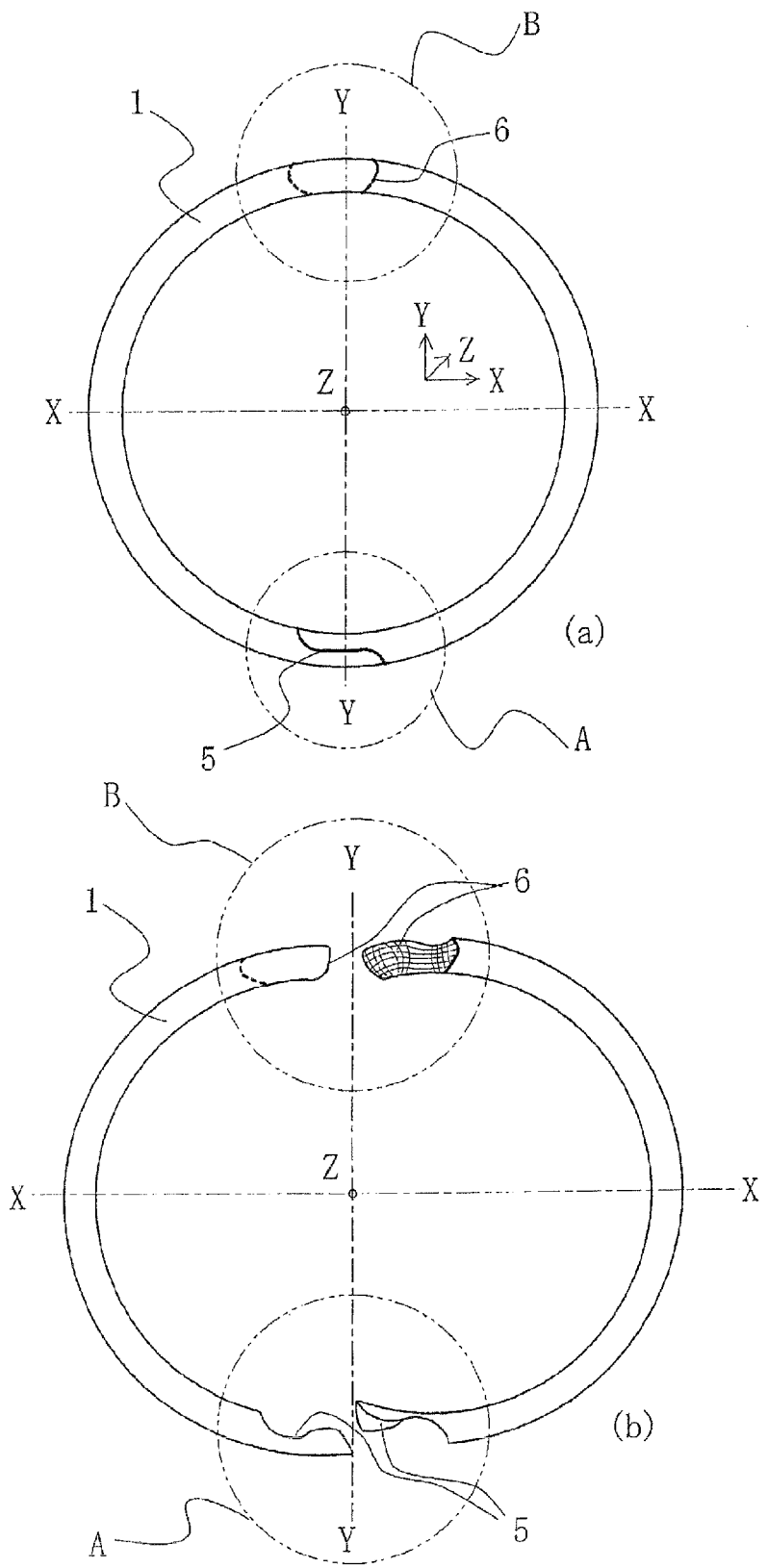
FIG. 3 is a side view representing FIGS. 2(a) and 2(b) rotated by 180° about an X-X axis and showing the O-ring as viewed from a reverse surface.

FIGS. 3(a) and 3(b) are side views respectively representing FIGS. 2(a) and 2(b) rotated by 180° about an X-X axis and showing the O-ring 1 as viewed from a reverse surface. Therefore, in FIG. 3, the cut portion A is shown towards the bottom of the drawing, and the cut portion B is shown towards the top of the drawing.

Looking at the cut portion A in FIGS. 2(a), 2(b) and FIGS. 3(a), 3(b), a longitudinal direction of the cut surface 5 of the cut portion A (i.e., direction m-m) extends diagonally so as to form a predetermined angle θ with respect to a radial direction of the ring, and has a substantially S-shaped profile in side view. Also, when viewed from the front side shown in FIGS. 2(a), 2(b), a side surface of the cut surface 5 has an S-shape having a large curvature, while when viewed from the reverse side shown in FIGS. 3(a), 3(b), a side surface of the cut surface 5 has an S-shape having a smaller curvature than that when viewed from the front side.

FIGS. 4(a), 4(b), and 4(c) are, respectively, cross-section views at points a, b, and c of the cut portion A in FIG. 2.

Figure 4:
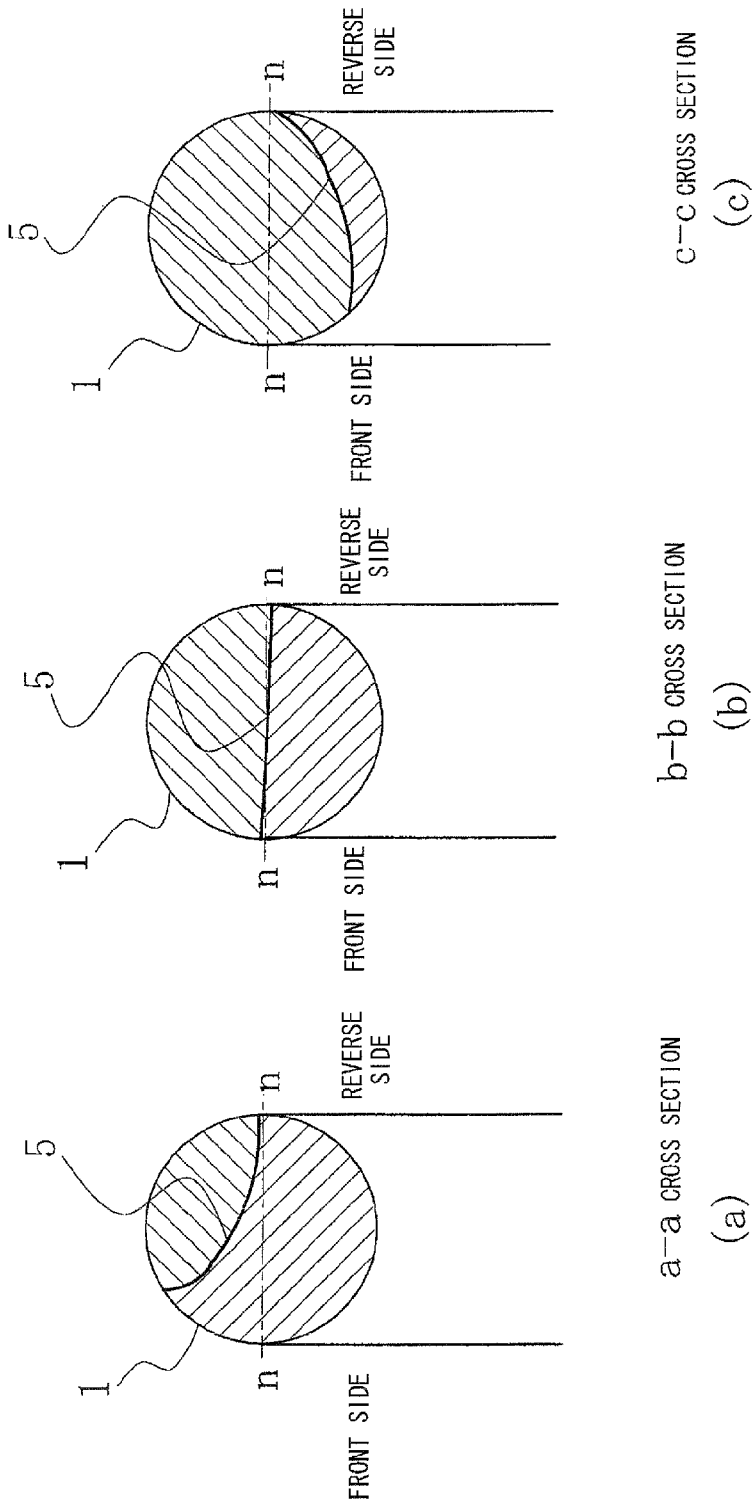
FIG. 4 is a cross-section view across a, b, and c in FIG. 2.

In FIG. 4(a), the cut surface 5 has an arcuate shape that decreases in height from the front side to the reverse side. In FIG. 4(b), the cut surface 5 has a shape that approximates a straight line in a substantially horizontal direction from the front side to the reverse side. In FIG. 4(c), the cut surface 5 has an arcuate shape that rises from the front side to the reverse side. FIG. 4 shows that the cut surface 5 has a curved shape along the width direction (i.e., n-n direction) that is not uniform but varies depending on position.

Thus, the cut surface of the cut portion has a three-dimensional curved surface shape that has a substantially S-shaped profile in side view and curves in a slalom shape.

The cut surface 6 of the cut portion B has a shape identical to that of the cut surface 5, only the orientation of the surface formed being different from that for the cut surface 5; a description will therefore be not provided.

In FIG. 4, looking at the relative movement relationship in the width direction (i.e., direction n-n) between an upper portion and a lower portion of the cut portion, in the location shown in FIG. 4(a), the upper portion cannot undergo a relative movement towards the front side, and in the location shown in FIG. 4(c), the upper portion cannot undergo a relative movement towards the reverse side. Therefore, in the cut portion, the upper portion and the lower portion of the ring cannot move relative to each other towards the front side or the reverse side (also referred to as the "width direction").

In an instance in which the O-ring 1 is held in a state of being compressed by an amount corresponding to the degree by which the O-ring 1 is crushed between an outer periphery side and an inner periphery side as shown, e.g., in FIG. 1, the O-ring 1 having a cut surface as described above has a cut surface disposed as shown by the cut surface 6 of the cut portion B in FIGS. 2 and 3. Since the cut surface is curved in a substantially S-shape in side view, no relative movement is possible in the circumferential direction (also referred to as an "axial direction") at the cut portion. Also, since the cut surface has a slalom-shaped curved shape that varies depending on position in the circumferential direction as shown in FIG. 4, no relative movement is possible in the width direction either.

Thus, the cut surface has a complex 3-dimensional curved surface shape that does not become displaced in the axial direction or the width direction of the ring. It is therefore possible to obtain sufficient sealing performance at the cut surface, and during fitting onto a device, a state of alignment can be maintained and the cut surface can be temporarily held with ease without use of an adhesive.

Figure 5:
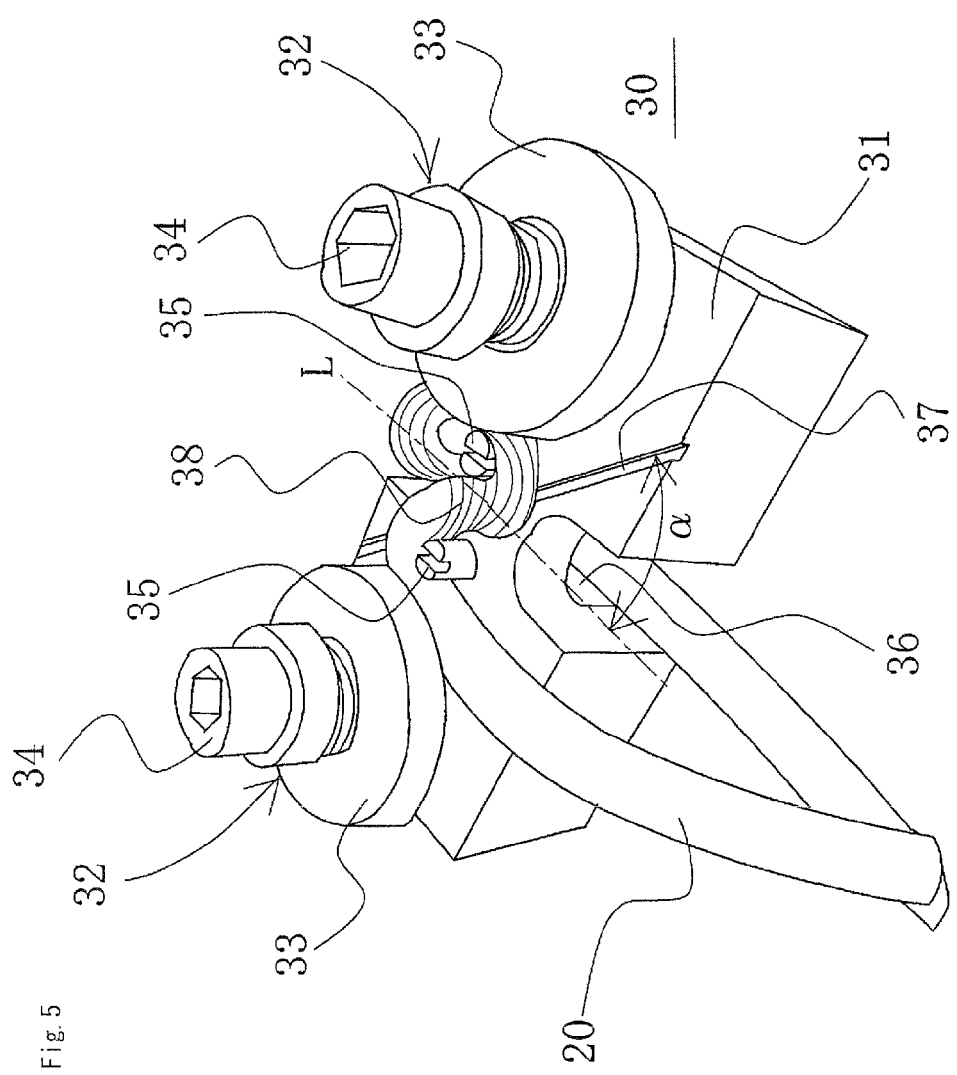
FIG. 5 is a perspective view used to illustrate a method for manufacturing the O-ring according to the embodiment of the present invention.
Figure 6:
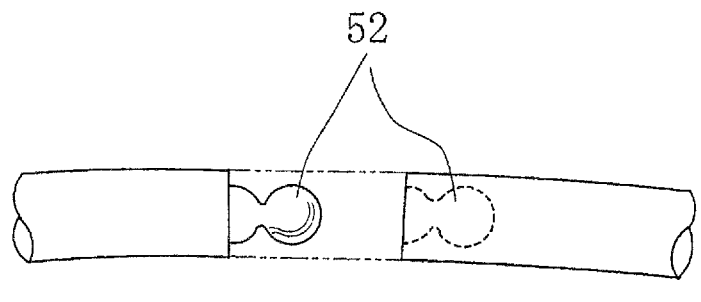
FIG. 6 is a drawing showing a cut portion according to a conventional method of molding or a similar method.
Figure 7:
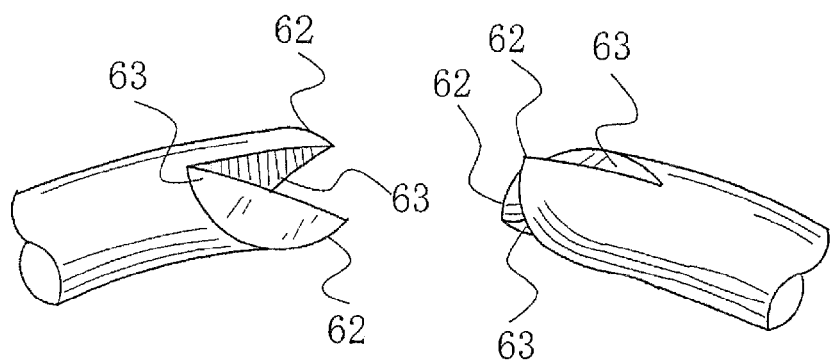
FIG. 7 is a drawing showing an example of a cut portion according to a conventional method of making an incision.
Figure 8:
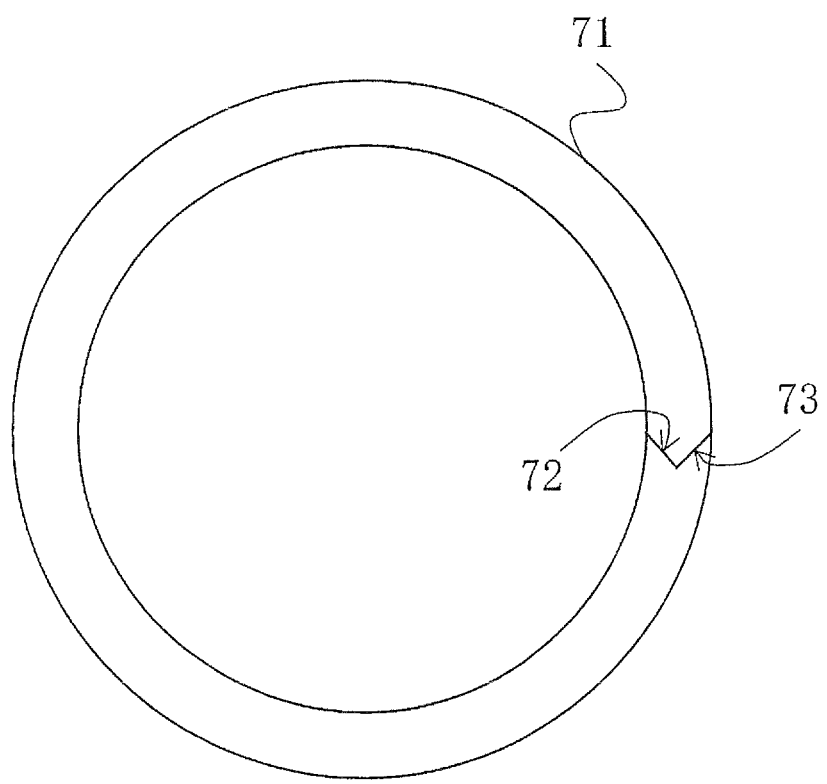
FIG. 8 is a drawing showing another example of a cut portion according to the conventional [method] of making an incision.

FIG. 5 is a perspective view used to illustrate a method for manufacturing the O-ring according to the embodiment of the present invention.

An O-ring 20 having a shape of an endless ring finished to predetermined dimensions as a standardized item (simply referred to as "O-ring 20" hereafter) is fitted to a jig 30 so that a cut portion can be formed at one portion in the circumferential direction.

The jig 30 has a substrate 31. A guide hole 36 through which the O-ring 20 is passed in a longitudinal direction is provided to the substrate 31 along a center line L. The guide hole 36 comprises a portion extending in the longitudinal direction in a tunnel shape along a bottom part of the substrate 31, and a portion extending in the vertical direction at each of an anterior end and a posterior end.

The substrate 31 comprises a immobilizing device 32 for securing the O-ring 20 and a corner member 35 provided at a position at which the O-ring 20 is to be bent, each provided symmetrically about the center line L.

The immobilizing device 32 comprises a immobilizing ring 33 for pressing the O-ring 20 against a surface of the substrate; a bolt 34 for supporting the immobilizing ring 33, the bolt 34 being screwed or otherwise provided so as to be capable of being adjusted in a vertical direction relative to the substrate 31; and other components.

The corner member 35 is screwed to or otherwise attached to the substrate 31 and arranged further towards a center than the immobilizing device 32. A space through which the O-ring 20 is inserted is formed between the immobilizing device 32 and the corner member 35.

A cutting line groove 37 is formed on the surface of the substrate 31 along the cut surface at a predetermined angle α with respect to the center line L.

The O-ring 20 is arranged in a longitudinal direction with respect to the substrate 31 so that a lower portion of the O-ring 20 passes through the guide hole 36 of the substrate 31. One side of a portion at which the cut portion is to be formed is secured by the immobilizing device 32 on the left side, the O-ring 20 is twisted about an axis, and another side of the twisted portion 38 is secured by the immobilizing device 32 on the right side. In such an instance, the immobilizing devices 32 and the corner members 35 secure the O-ring 20 so that the O-ring 20 is in a state of being curved in an S-shape as shown in the drawing.

In this state, a cutting blade provided above (not shown) is lowered, and the twisted portion 38 of the O-ring 20 is linearly cut along the cutting line groove 37.

The cut O-ring 20 becomes untwisted and turns into the O-ring 1 having a cut surface as shown in cut portion A or B in FIGS. 2 and 3.

The orientation in the width direction of the cut surface is determined by the manner in which the O-ring 20 is fitted to the jig 30.

The above-described manufacturing method using the jig 30 is only provided by way of example. Any other method can be used as long as the O-ring 20 is twisted about the axis and caused to bend into an S-shape, and the corresponding portion is cut diagonally.

The twisting angle with respect to a predetermined length in a circumferential direction of the O-ring 20 is established as a matter of design. However, if the angle is less than 180°, the extent of twist is smaller, and the degree by which the O-ring 20 is hooked in the width direction and the axial direction is smaller. If the twisting angle exceeds 540°, the length of the cut portion increases, and it becomes difficult to perform the cutting. Therefore, a range of between 180° and 540° is preferable.

Also, the cutting angle, i.e., the angle α of the cutting line groove 37 with respect to the center line L, is also established as appropriate. However, if the cutting angle is larger than 45° or larger than 60°, a section having a small plate thickness is formed at the cut portion of the O-ring 20 depending on location. Therefore, a range of between 45° and 60° is preferable.

The present invention is not limited in scope by the embodiment described above. For example, the present invention may be applied not only to an O-ring having a circular cross-section but also to a ring-shaped squeeze packing having any cross-section profile. Also, the cut surface is not required to have a perfect S-shape in side view; it may have, e.g., an S-shape having a smaller trajectory curvature than a standard S-shape, an S-shape having a larger trajectory curvature than a standard S-shape, a vertically elongated S-shape, a laterally elongated S-shape, or another substantial S-shape.

REFERENCE SIGNS LIST

1 O-RING
2 FIRST BACKUP RING
3 SECOND BACKUP RING
5 CUT SURFACE OF CUT PORTION A
6 CUT SURFACE OF CUT PORTION B
10 SEAL COVER
11 ROTATING SHAFT
12 STATIONARY-SIDE SEALING ELEMENT
13 ROTATION-SIDE SEALING ELEMENT
14 SEAL SURFACE
15 DRIVE PIN
16 SPRING
17 COLLAR
18 KNOCK PIN
19 SET SCREW
20 ENDLESS RING-SHAPED O-RING
30 JIG
31 SUBSTRATE
32 IMMOBILIZING DEVICE
33 IMMOBILIZING RING
34 BOLT
35 CORNER MEMBER
36 GUIDE HOLE
37 CUTTING LINE GROOVE
38 TWISTED PORTION

The invention claimed is:

1. A squeeze packing, comprising a ring finished to predetermined dimensions, wherein the ring has at at least one arbitrary portion thereof cut surfaces extending diagonally, so as to form a predetermined angle $\theta$ with respect to a radial direction of the ring, said cut surfaces having two non-uniform S-shaped profiles extending through the width and the thickness or diameter of the ring, the S-shaped profiles having different curvatures in each side view, and said cut surfaces having three-dimensional curved surfaces in a width direction across a front side and reverse side.

2. A method for manufacturing a squeeze packing as claimed in claim 1, characterized in comprising:

applying a twist in at least one arbitrary portion of a ring finished to predetermined dimensions, the twist being centered about a circumferential direction axis of the ring; bending the ring in an S-shape; and cutting the bent portion diagonally, thereby forming cut surfaces extending diagonally that, when the twist is released, said cut surfaces have two non-uniform S-shaped profiles extending through the width and the thickness or diameter of the ring, the S-shaped profiles having different curvatures in each side view, and said cut surfaces have three-dimensional curved surfaces in a width direction across a front side and reverse side.

* * * * *